US006010758A

United States Patent [19]

Anglin, Jr.

[11] Patent Number: 6,010,758

[45] Date of Patent: Jan. 4, 2000

[54] SHRAPNEL MITIGATION SYSTEM

[76] Inventor: Richard L. Anglin, Jr., 2115 Heather La., Del Mar, Calif. 92014-2244

[21] Appl. No.: 08/873,764

[22] Filed: Jun. 12, 1997

[51] Int. Cl.[7] .......... B32B 4/00

[52] U.S. Cl. .......... 428/14; 428/38; 428/46

[58] Field of Search .......... 428/14, 38, 46

[56] References Cited

U.S. PATENT DOCUMENTS

| | | | |
|---|---|---|---|
| 912,950 | 2/1909 | Gibert | 428/38 |
| 2,721,157 | 10/1955 | Martin et al. | 428/46 X |
| 4,637,444 | 1/1987 | Tanner | 442/6 X |
| 4,742,664 | 5/1988 | Johnson | 428/34 X |
| 4,748,790 | 6/1988 | Frangolacci | 428/116 X |
| 5,645,940 | 7/1997 | Teddington, Jr. | 428/46 X |
| 5,670,222 | 9/1997 | Tanaka et al. | 428/46 X |

FOREIGN PATENT DOCUMENTS

| | | |
|---|---|---|
| 0 518 698 | 12/1992 | European Pat. Off. . |
| 1 399 071 | 8/1965 | France . |
| 83 21 690 U | 12/1983 | Germany . |
| 2 296 020 | 6/1996 | United Kingdom . |

*Primary Examiner*—Archene Turner
*Attorney, Agent, or Firm*—Anglin & Giaccherini

[57] ABSTRACT

Methods and apparatus which enable the lateral displacement of windows and window elements in reaction to overpressure forces resulting from an explosion are disclosed. According to the present invention, these forces are released to the edges of the displaced window and window elements, and the window itself remains intact or does not release life-threatening or injurious projectiles. One embodiment of the invention (10) comprises a window frame (12) which holds a pane of glass or synthetic material such as acrylic or polycarbonate (14), the frame (12) being coupled to a window receiving pan or receptor (16) by a plurality of retainers (18). The overpressure from an explosive blast causes the frame (12) to be displaced primarily laterally from the receiving pan (16) thereby releasing the blast overpressure (20) to the edges of the displaced frame (12) and reducing the risk of release of shrapnel from said sheet of generally light transmissive material (14). The retainers (18) may be woven cloth straps (18A), rope (18B), metallic and non-metallic cable (18C), mono-filament such as nylon (18D), and plastic (18E) including polymers such as Kevlar™.

19 Claims, 21 Drawing Sheets

10

SHRAPNEL MITIGATION SYSTEM

FIELD OF THE INVENTION

The present invention relates to the field of reducing high velocity particles resulting from explosive overpressure. More particularly, this invention provides methods and apparatus for enabling primarily lateral displacement of windows and window elements such that overpressure from an explosive blast is released to the edges of the displaced window so that the window or window elements do not shatter and release projectiles.

BACKGROUND OF THE INVENTION

On Jun. 25, 1996, twenty-three died and hundreds were injured as a result of a terrorist attack on the United States Air Force housing complex on King Abdul Aziz Airbase outside Dhahran, Saudi Arabia. The carnage was caused by flying debris from the glass windows which were explosively shattered by the bomb that was detonated over one-quarter of a mile away. The United States Defense Special Weapons Agency ("DSWA") estimated that glass fragmentation caused ninety percent (90%) of all injuries. The conventional glass windows were shattered by the force of the explosive overpressure directly or indirectly applied to them.

Several attempts to reduce the hazards of glass shrapnel have yielded limited success. Military forces housed in buildings may be protected by replacing conventional glass windows with synthetic materials such as acrylic or polycarbonate which will not shatter and produce high velocity projectiles. This solution is undesirable for a number of reasons. First, the mass of material required to resist overpressure on the order of three pounds per square inch (3 psi) (~500 psf) is very large. As a result, a window pane would be very thick, very heavy and viewing would be significantly distorted. Building construction methods would also have to be modified to accommodate the added bulk and weight. Window receiving pans or receptors inset within a wall would also need to be significantly strengthened or redesigned.

Another attempt to reduce shrapnel concerns methods and apparatus to allow the overpressure to be reduced by redirecting or dissipating its effects.

The development of a window system which would substantially reduce the danger of flying shrapnel would fulfill a long felt but unmet need. Such an innovation would also constitute a significant advance in the field of window technology.

SUMMARY OF THE INVENTION

The present invention provides methods and apparatus to enable primarily lateral displacement of windows and window elements in reaction to overpressure forces resulting from an explosion. According to the present invention, these forces are released to the edges of the displaced window and window elements, and the window itself remains intact or does not release life-threatening or injurious projectiles.

In the simplest embodiment of the disclosed invention, a lateral displacement mechanism comprises a number of retainers having one end attached to a window frame and the other attached to the window framework embedded in the window wall or other structure. In normal use, the retainers are hidden in the window framework between the window frame and the wall. Under explosive overpressure, the window frame is displaced laterally from the wall to the extended length of the retainers. As the overpressure is reduced, the window pane falls under gravity, contacting the wall or other structure and perhaps the floor. The totality of retainers is designed not to rupture under the applied overpressure.

In alternative embodiments, the retainers are comprised of cloth webbing, rope, synthetic materials, mechanical mechanisms or membranes. A particularly advantageous retainer is a Velcro™ strap. Velcro obtains its holding ability from the mechanical interaction of "hook" material with opposing "eye" material. Use of Velcro™ retainers delivers a graceful and controlled lateral displacement because of the "zippered" detachment of the two halves of the Velcro™.

Alternative configurations enable angular displacement via a hinge connection between the window frame and its receiving pan. Further alternative embodiments comprise adhering or bonding sheets or films of synthetic material such as Mylar™ to a traditional glass window to prevent release of shrapnel or projectiles from glass sheathing as a result of displacement forces. Further alternative configurations comprise "shatter-proof" or "blast-proof" glass or other synthetic material which likewise laterally displace from a window frame via points of attachment between an embedded web or mesh and the frame.

An appreciation of the other aims and objectives of the present invention and a more complete and comprehensive understanding of this invention may be obtained by studying the following description of a preferred embodiment and by referring to the accompanying drawings.

DETAILED DESCRIPTION OF PREFERRED & ALTERNATIVE EMBODIMENTS

Elements of a Conventional Window System

Figure 1:
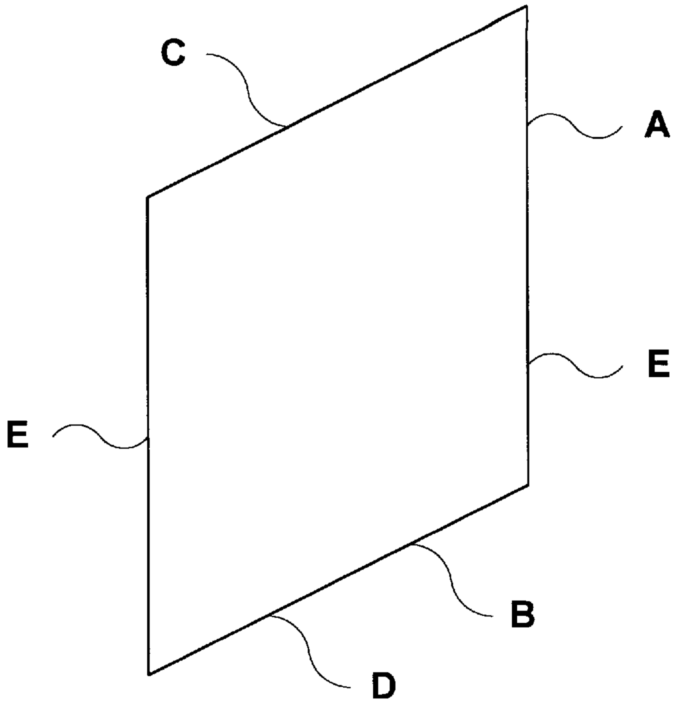
FIG. 1 shows a traditional window and its elements.

FIG. 1 exhibits a conventional window A comprising a frame B as well as one or more fixed or movable elements within the frame B.

Figure 2:
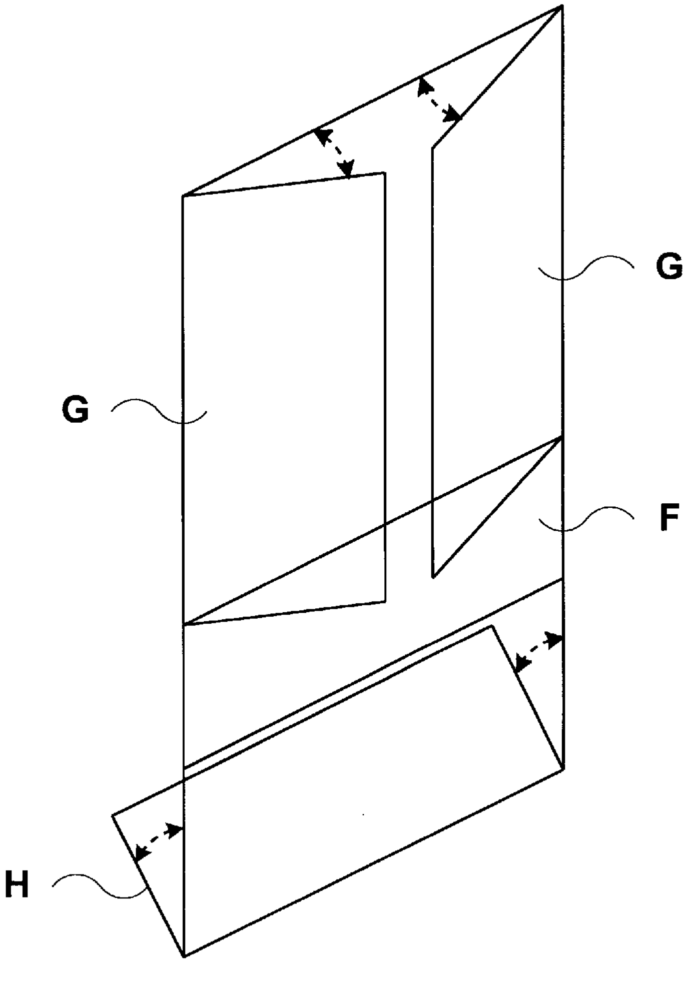
FIG. 2 shows a fixed and moveable elements within a window.

As best seen in FIG. 1, the frame B comprises the head C, the horizontal portion of the frame B at the top of the window A, the sill D, the horizontal portion of the frame B at the bottom of the window A, and the jambs E, the vertical portions of the frame B on either side of the window A. As is exhibited in FIG. 2, a fixed element F does not move. The movable elements G, H may move horizontally G or vertically H.

Figure 3:
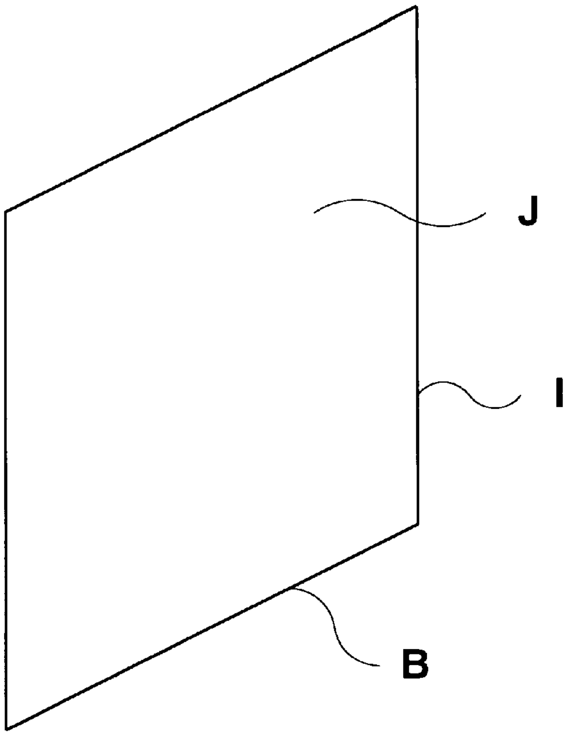
FIG. 3 shows a single fixed window.
Figure 4:
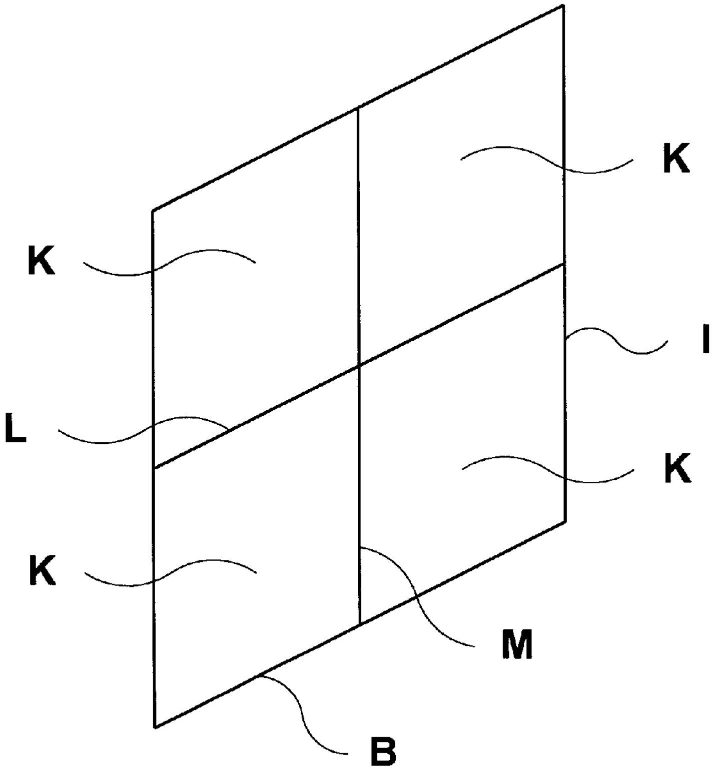
FIG. 4 shows a multi-pane fixed window.

A fixed window I comprises a frame B surrounding a single piece of glass, a pane J, or other material which may be transparent, translucent or opaque as exhibited in FIG. 3. FIG. 4 exhibits that window I may also comprise multiple pieces of glass K or other material, panes, separated by horizontal muntin(s) L or vertical muntin(s) M.

Figure 5:
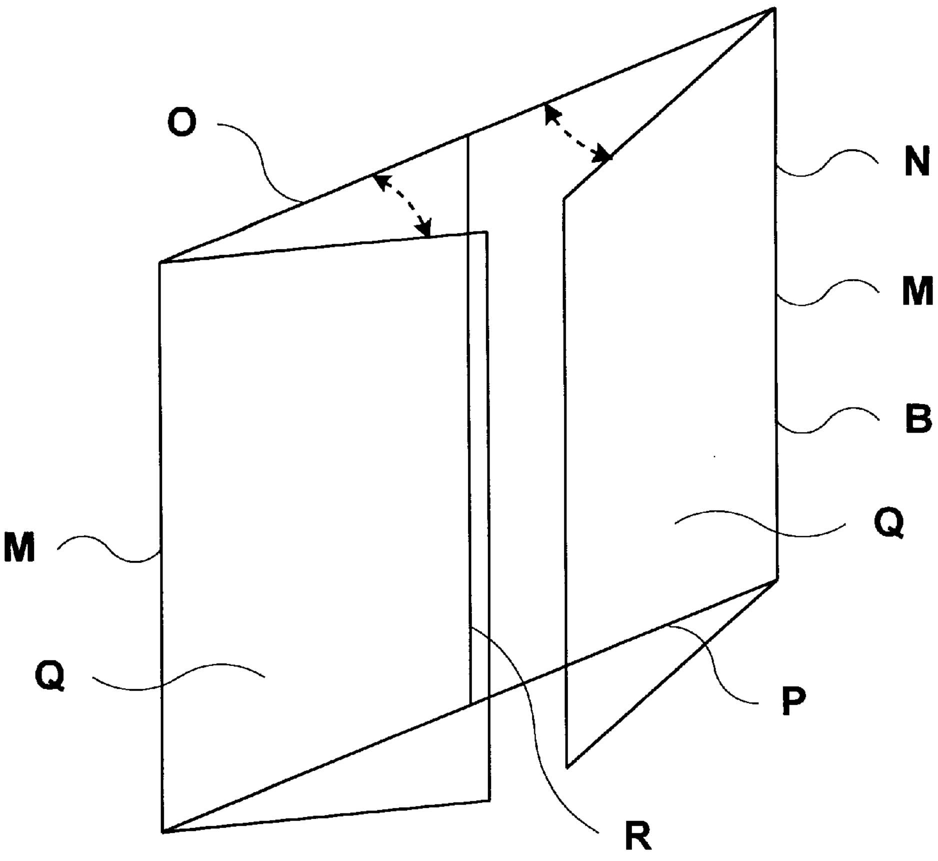
FIG. 5 shows a casement window.

FIG. 5 exhibits a view of a casement window N comprising a frame B with a top O and bottom P meeting rail, left and right vertical mullions M, one or more casement ventilator(s) Q, and a meeting stile R. A casement ventilator Q may comprise a single pane J or multiple panes K.

Figure 6:
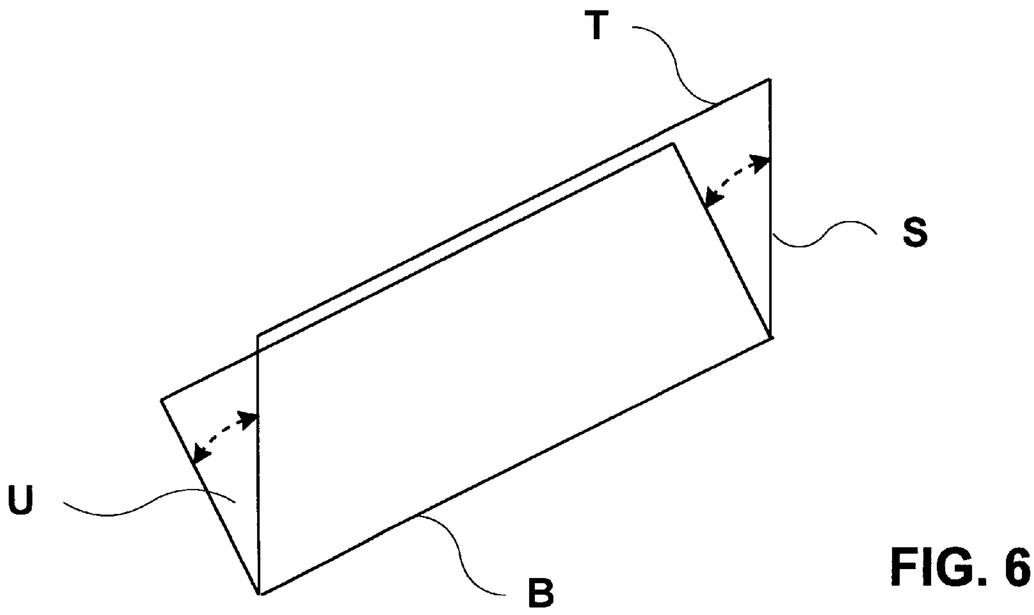
FIG. 6 shows a projected window.

A projected window S comprises a frame B with meeting rail T and a projected ventilator U. The projected ventilator may be hinged at the top or bottom as shown in FIG. 6. The projected ventilator U may comprise a single pane J or multiple panes K. A particular type of projected window is an awning window in which a plurality of projected ventilators move in unison.

Figure 7:
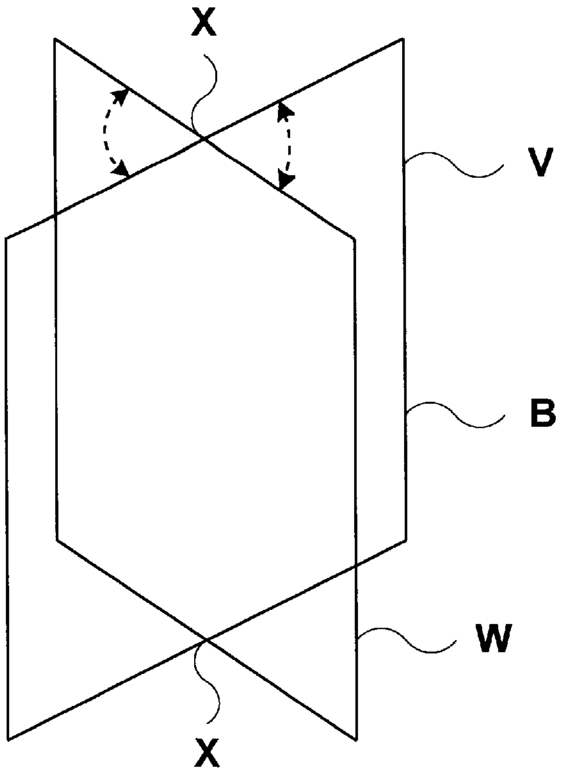
FIG. 7 shows a pivoted window.

A pivoted window V comprises a frame B and a moveable element, the pivoting ventilator W, which rotates about pivot points X. The pivoting ventilator W may pivot about a vertical axis as shown in FIG. 7 or about a horizontal axis, which is not shown. A particular type of pivoted window is a jalousie window in which a plurality of pivoted ventilators move in unison.

Figure 8:
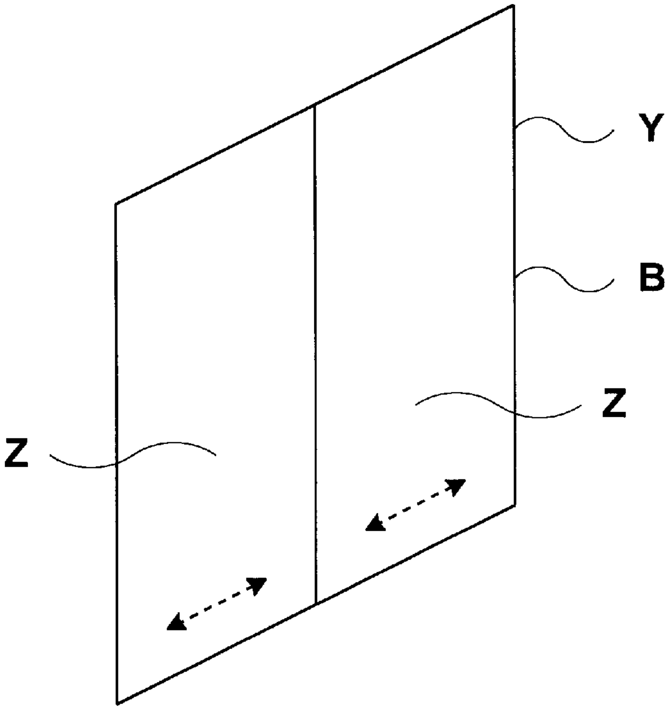
FIG. 8 shows a sliding window.

A sliding window Y comprises a frame B within which one or more elements slide past one another for the window to open. The sliding ventilator Z may more horizontally as shown in FIG. 8 or vertically, which is not shown. A double hung window, not illustrated, is a particular type of sliding window comprising two vertical sliding ventilators Z. A single hung window comprises one vertical sliding ventilator Z and a fixed element F.

A combination window may include a plurality of fixed, casement, projected, pivoted or sliding elements.

Figure 9:
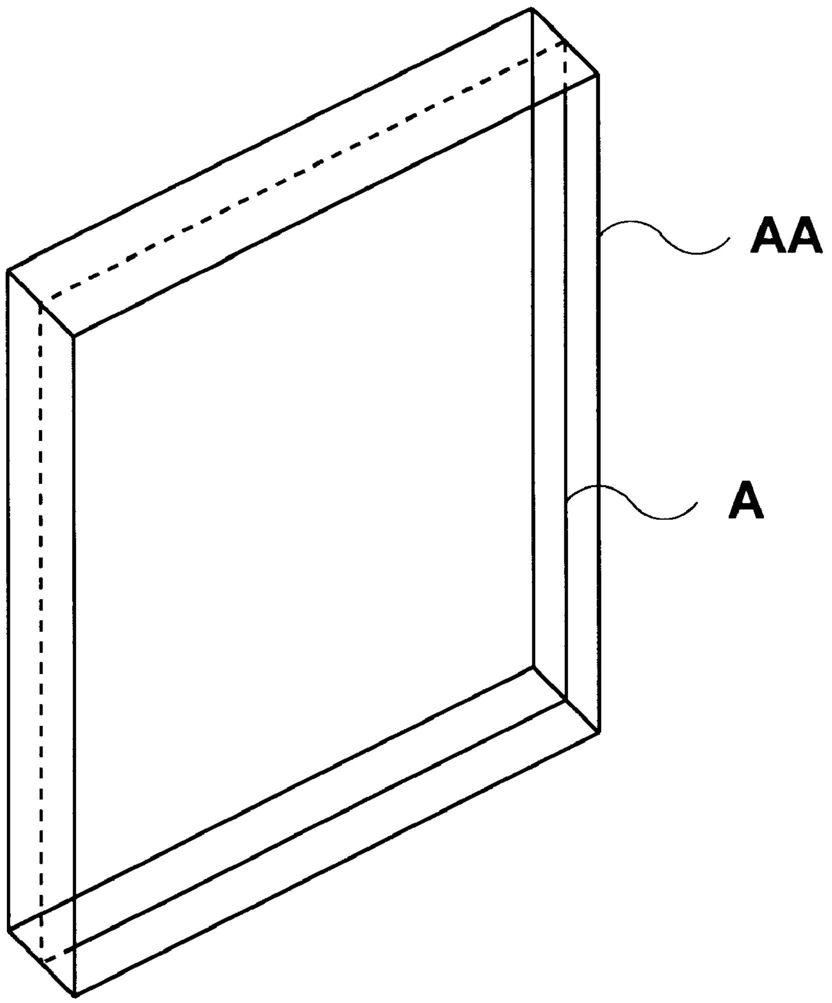
FIG. 9 shows a window set into its receiver pan or receptor.
Figure 10:
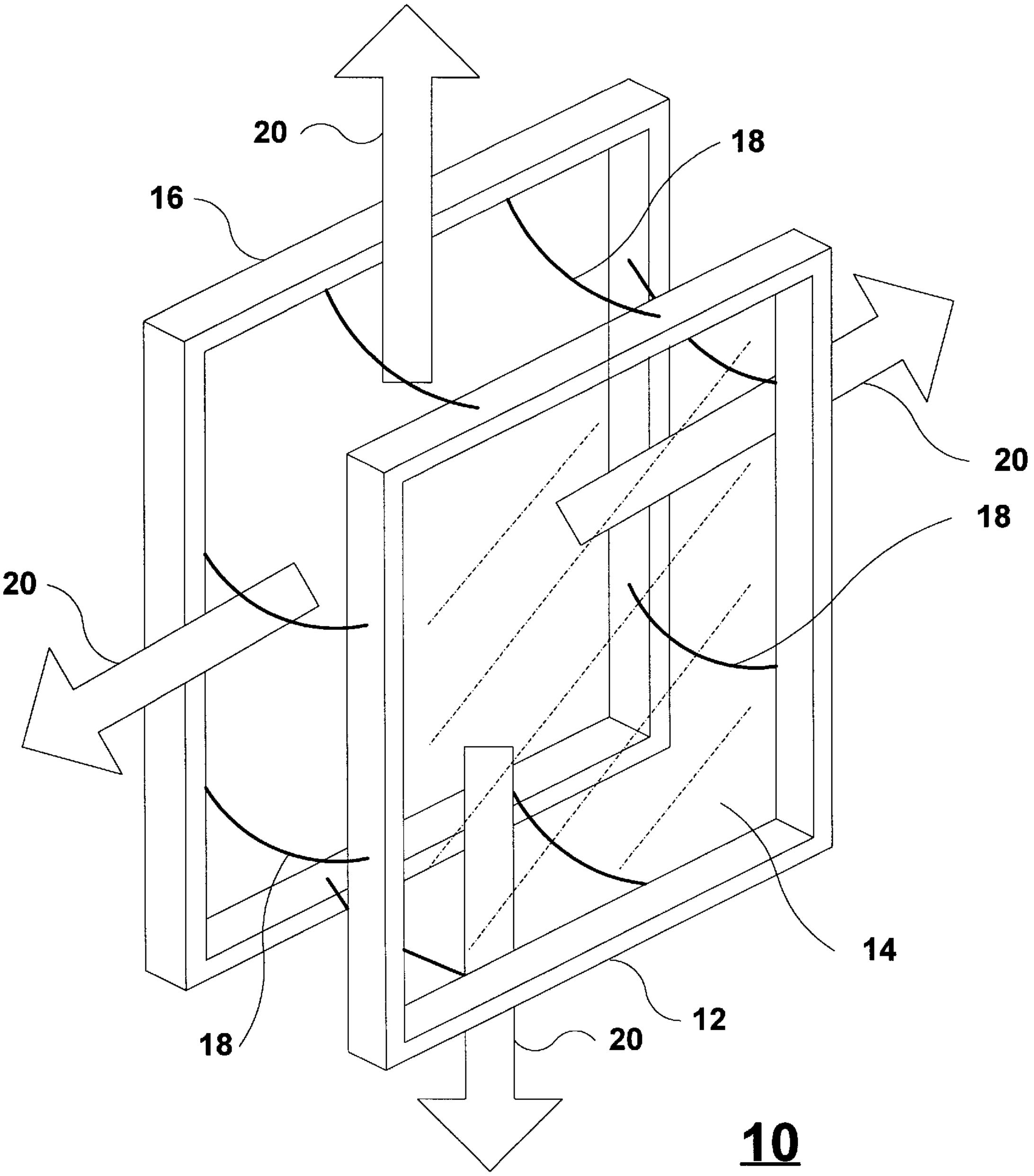
FIG. 10 shows an embodiment of the disclosed invention which utilizes a plurality of retainers connected between the window frame and the window receiving pan as the lateral displacement mechanism.
Figure 11:
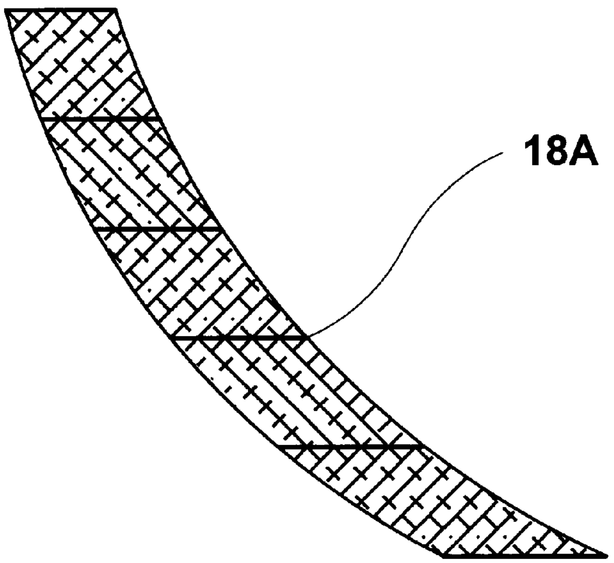
FIG. 11 shows an embodiment of the disclosed invention which utilizes a plurality of woven cloth straps connected between the window frame and the window receiving pan as the lateral displacement mechanism.
Figure 12:
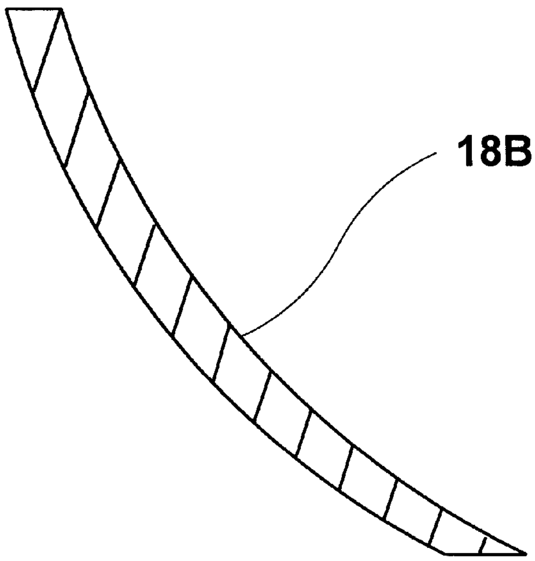
FIG. 12 shows an embodiment of the disclosed invention which utilizes a plurality of ropes connected between the window frame and the window receiving pan as the lateral displacement mechanism.
Figure 13:
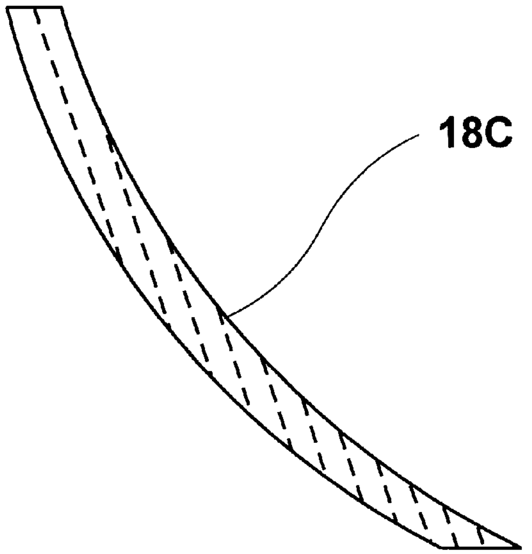
FIG. 13 shows an embodiment of the disclosed invention which utilizes a plurality of cables connected between the window frame and the window receiving pan as the lateral displacement mechanism.
Figure 14:
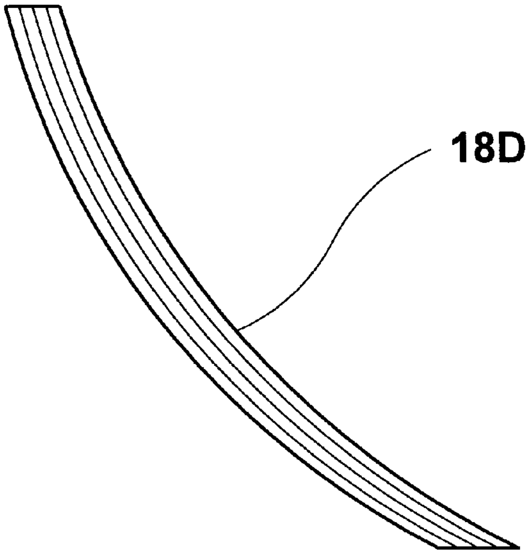
FIG. 14 shows an embodiment of the disclosed invention which utilizes a plurality of filaments connected between the window frame and the window receiving pan as the lateral displacement mechanism.
Figure 15:
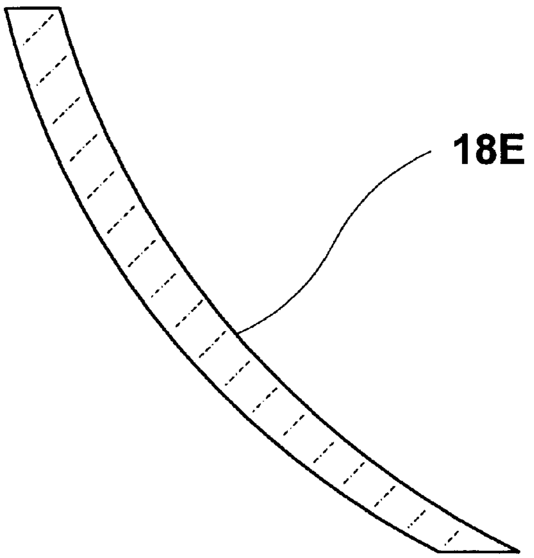
FIG. 15 shows an embodiment of the disclosed invention which utilizes a plurality of plastic straps connected between the window frame and the window receiving pan as the lateral displacement mechanism.

FIG. 9 exhibits a window A siting inside of and affixed to a receiving pan AA, also termed a receptor AA, which is affixed to the structure.

A Preferred Embodiment of the Invention

A preferred embodiment of the disclosed invention comprises a window frame 12 to which a plurality of Velcro™ straps 18F are attached and the other end of each Velcro™ strap 18F being attached to the window receiving pan or receptor 16.

Figure 16:
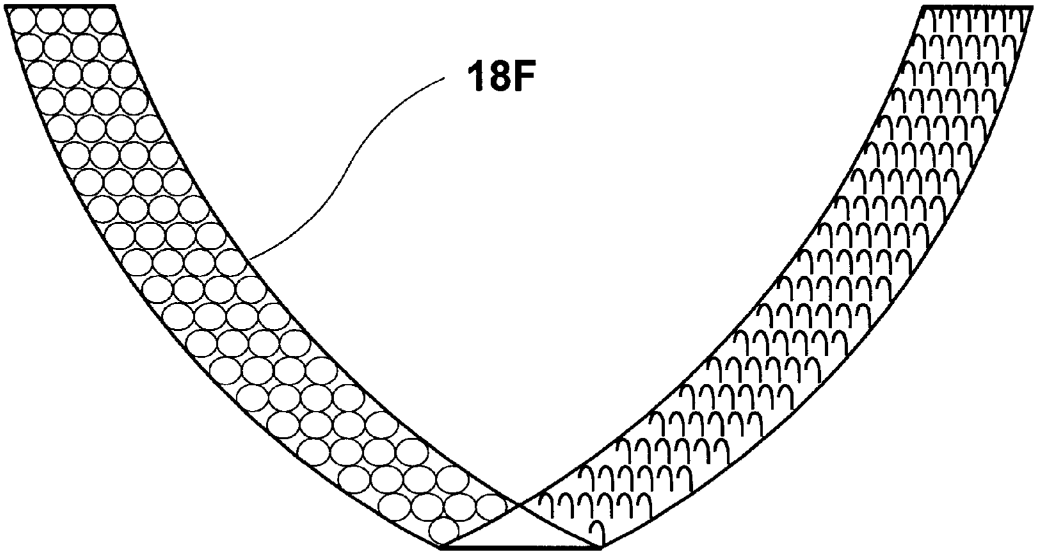
FIG. 16 shows a preferred embodiment of the disclosed invention which utilizes a plurality of Velcro™ straps connected between the window frame and the window receiving pan as the lateral displacement mechanism.

The Velcro™ straps 18F exhibited in FIG. 16 are comprised for approximately half of their length of "hook" material, and for approximately half of their length of "eye" material. When the frame 12 is installed in its receiving pan or receptor 16, the Velcro™ straps 18F are folded approximately in half such that the hooks and eyes are connected. The force required to separate a particular Velcro™ strap 18F is a function of the size of the individual hooks and eyes and proportional to the hook and eye contact area. In the instant invention the Velcro™ straps 18F are sized to separate under an applied overpressure force such as generated from an explosion. As the Velcro™ straps 18F separate they allow the frame 12 to be displaced laterally. As the overpressure forces 20 dissipate, gravity will pull the frame 12 downward. The Velcro™ straps 18F confine the movement of the frame 12.

The instant embodiment delivers a graceful and controlled lateral displacement of the frame 12 because of the "zippered" detachment of the two halves of the Velcro™ straps 18F.

Alternative Embodiments

Figure 17:
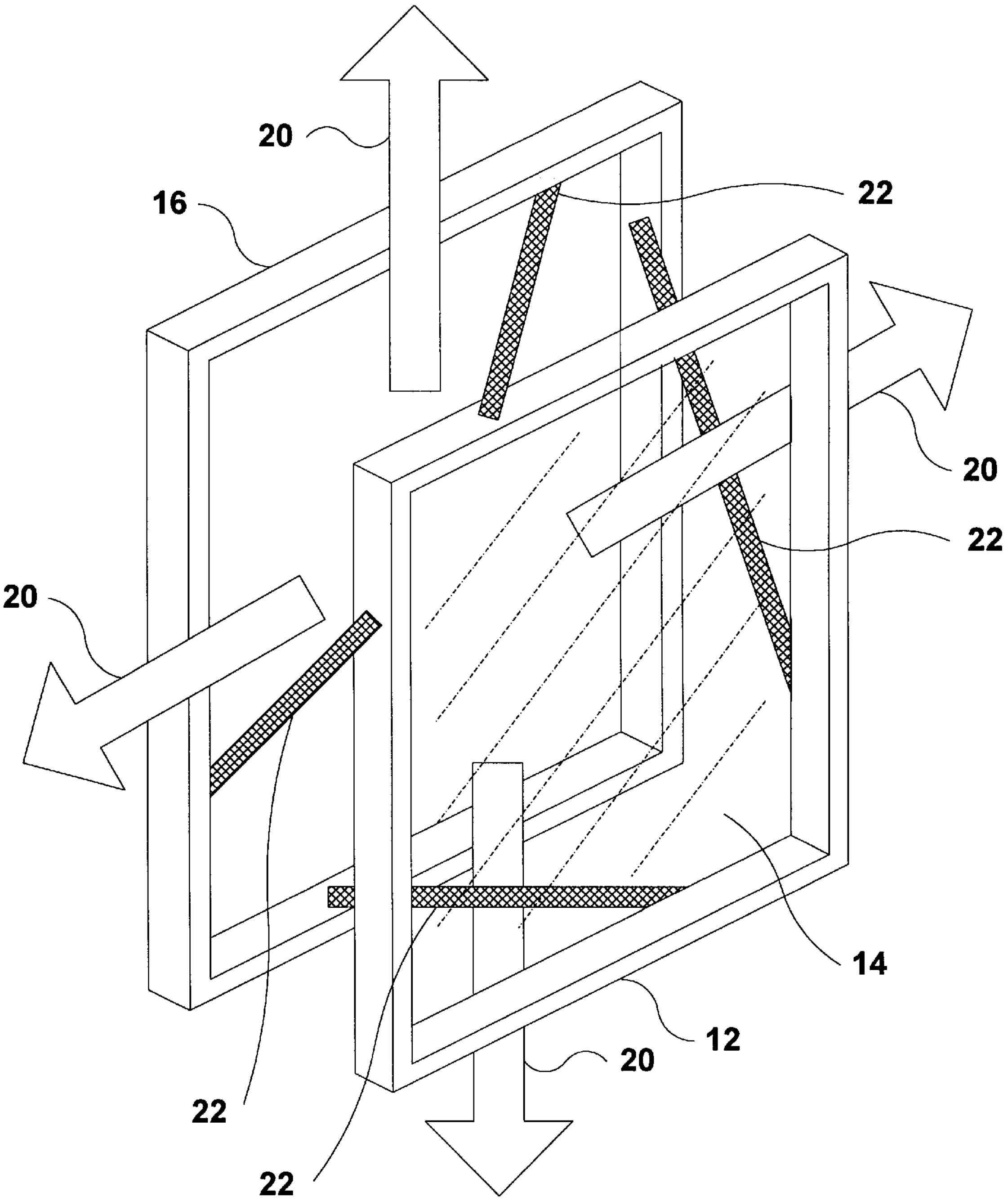
FIG. 17 shows an embodiment of the disclosed invention which utilizes a plurality of single-lever mechanical arms as the lateral displacement mechanism.

Less graceful but equally functional alternative embodiments are entirely mechanical in character. In the alternative embodiment exhibited in FIG. 17 the retainers 18 are replaced with a plurality of metal or composite material single-lever arms 22. When the frame 12 is displaced, the single-lever arms 22 support it. When the frame 12 is in its normal position in its receiving pan or receptor 16, the single-lever arms 22 are hidden inside the receiving pan or receptor 16.

Figure 18:
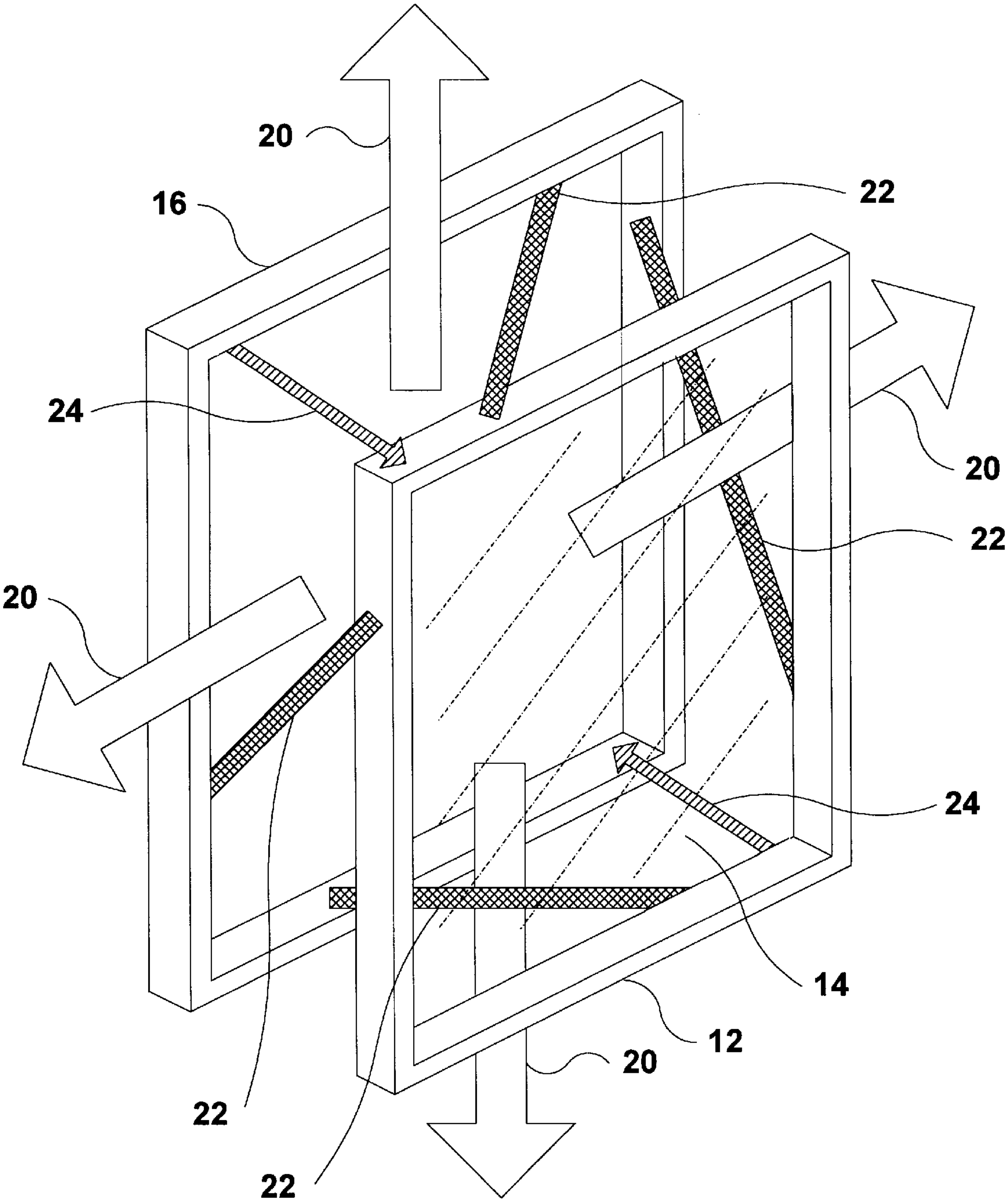
FIG. 18 shows an embodiment of the disclosed invention which utilizes a plurality of single-lever mechanical arms deploying against the resistance of springs as the lateral displacement mechanism.

A further alternative embodiment is the plurality of single-lever arms 22 deploying against the resistance of a plurality of springs 24 as shown in FIG. 18. The springs 24 may be comprised of any elastomeric material or mechanical configuration. When the frame 12 is in its normal position in its receiving pan or receptor 16, the springs 24 are hidden inside the receiving pan or receptor 16 along with the single-lever arms.

Figure 19:
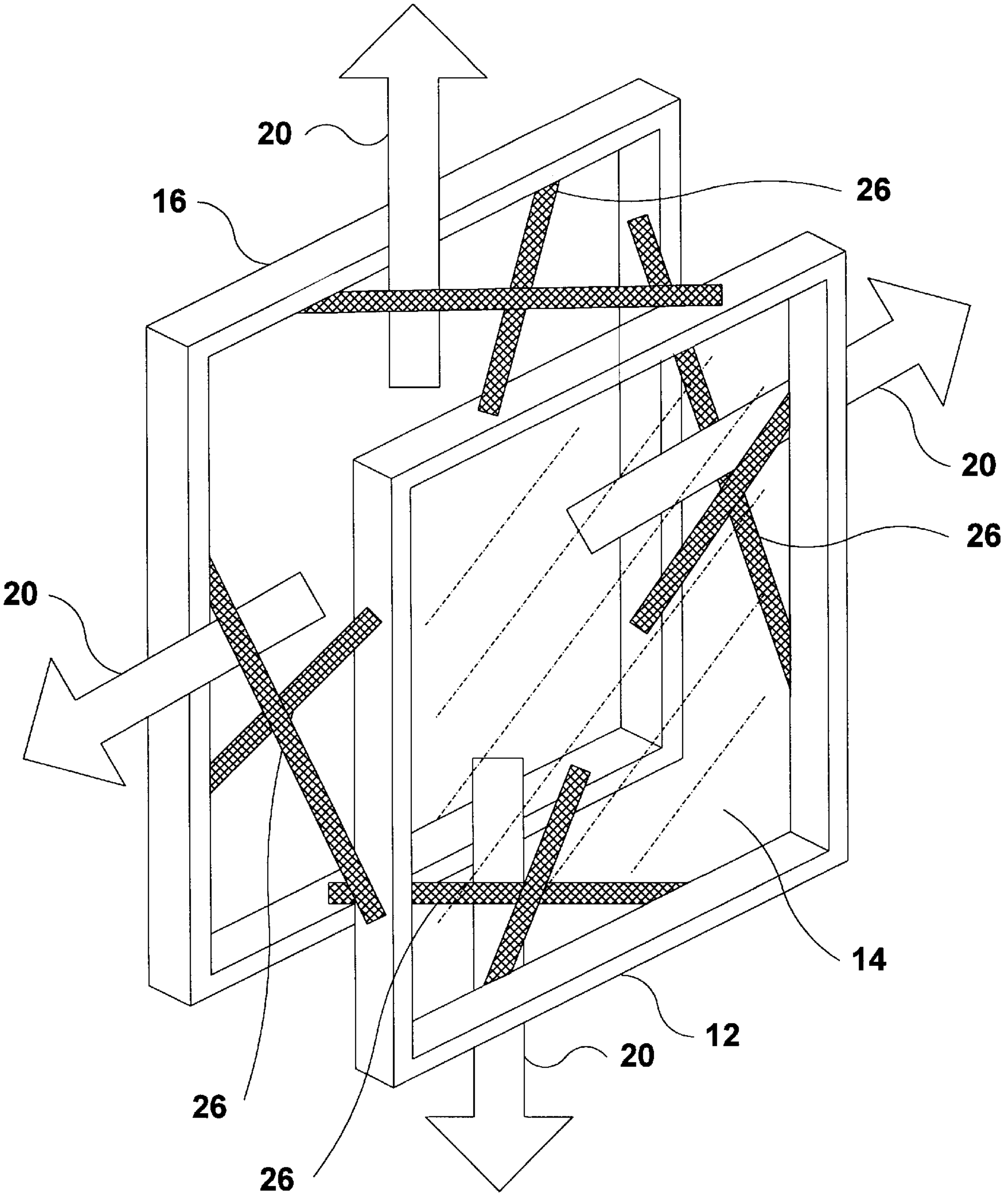
FIG. 19 shows an embodiment of the disclosed invention which utilizes a plurality of mechanical scissors mechanisms as the lateral displacement mechanism.

In a further alternative embodiment exhibited in FIG. 19, the retainers 18 are replaced with a plurality of metal or composite material mechanical scissors mechanisms 26. When the frame 12 is displaced, the scissors mechanisms 26 support it. When the frame 12 is in its normal position in its receiving pan or receptor 16, the scissors mechanisms 26 are hidden inside the receiving pan or receptor 16.

Figure 20:
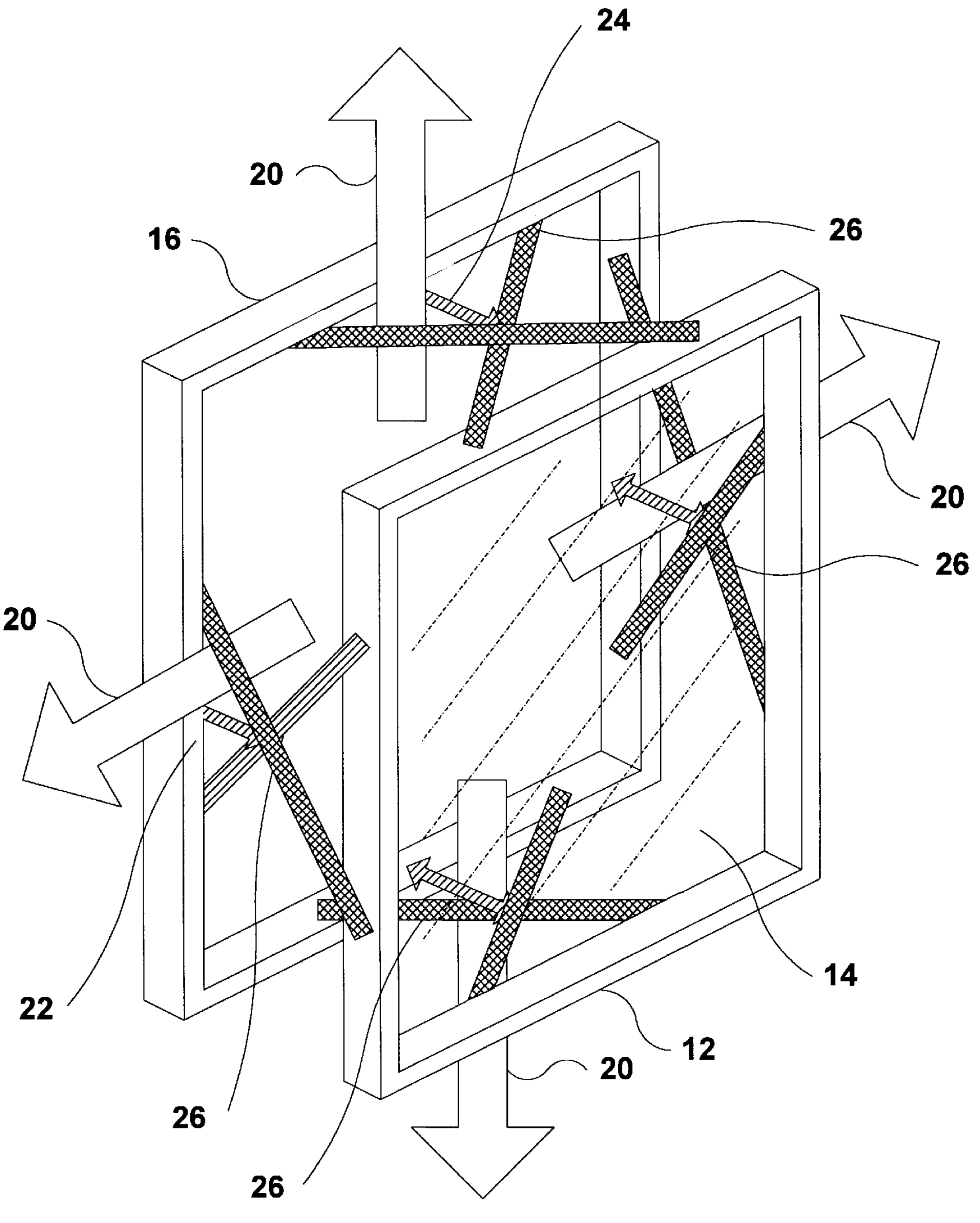
FIG. 20 shows an embodiment of the disclosed invention which utilizes a plurality of mechanical scissors mechanisms deploying against the resistance of springs as the lateral displacement mechanism.

A further alternative embodiment exhibited in FIG. 20 is the plurality of scissors mechanisms 26 deploying against the resistance of a plurality of springs 24. When the frame 12 is in its normal position in its receiving pan or receptor 16, the springs 24 are hidden inside the receiving pan or receptor 16 along with the scissors mechanisms 26.

Figure 21:
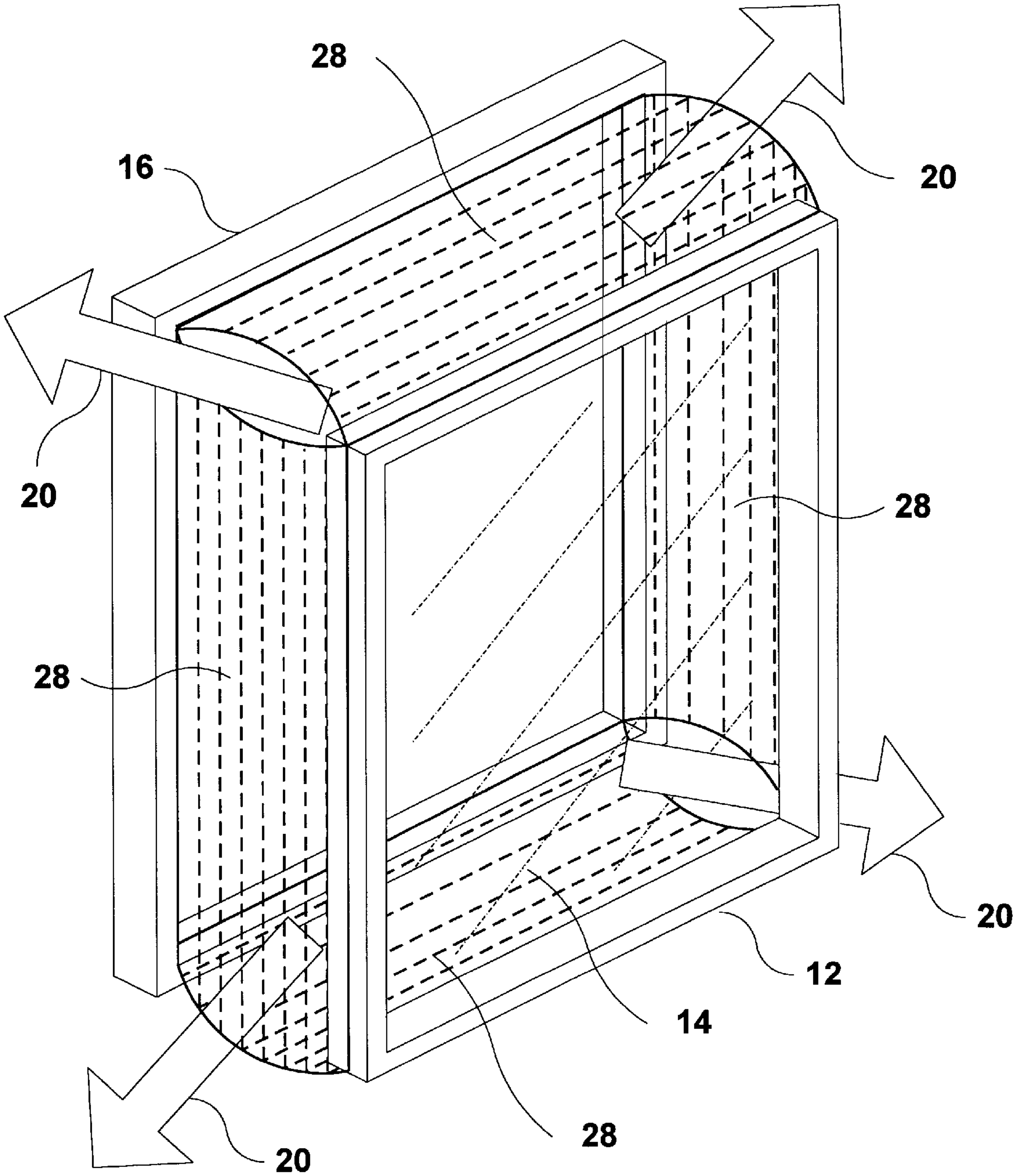
FIG. 21 shows elevated edges of the receiving pan or receptor used to hold the frame within the elevated edges.

In a further alternative embodiment exhibited in FIG. 21, the frame 12 displaces laterally via an elastomeric membrane 28 connected between the frame 12 and the receiving pan or receptor 16. When the frame 12 is in its normal position in its receiving pan or receptor 16, the membrane 28 is hidden inside the receiving pan or receptor 16.

The elastomeric membrane 28 may be single walled as shown in FIG. 21 or double walled which is not shown. The elastomeric membrane 28 may also be an open tube or a closed tube which may be pressurized or evacuated to offer resistance to displacement under normal conditions.

To allow the lateral displacement of the frame 12 from its receiving pan or receptor 14, the frame 12 is not rigidly affixed to the receiving pan or receptor 16. Friction is one method of holding the frame 12 within its receiving pan or receptor 16 in normal use. The frame 12 is sized such that it will not displace from its receiving pan or receptor 16 under normal conditions. Wind design loads typically range from 30 to 100 psf. The disclosed invention is designed to laterally displace as a result of overpressures on the order of 2 to 3 psi (~300 to 500 psf) and not at lesser pressures.

Another method of holding the frame 12 within its receiving pan or receptor 16 under normal pressures is to shape the receiving pan or receptor 16 with elevated edges 30 such as shown in FIG. 21. Under normal pressures the frame 12 sits between the elevated edges 30. Under blast overpressures, the frame 12 displaces over the elevated edges 30 of the receiving pan or receptor 16.

Figure 22:
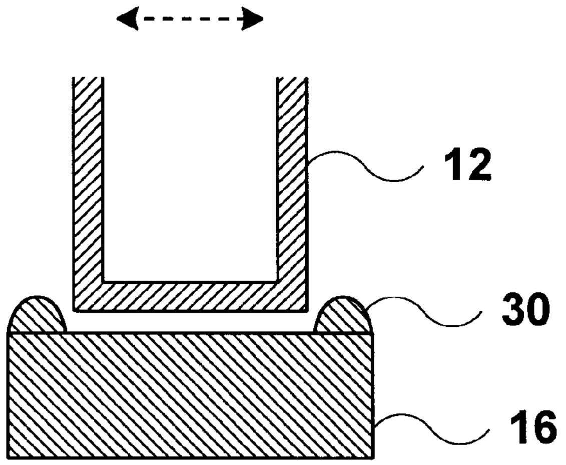
FIG. 22 shows frangible edges of the receiving pan or receptor used to hold the frame within the elevated edges.
Figure 23:
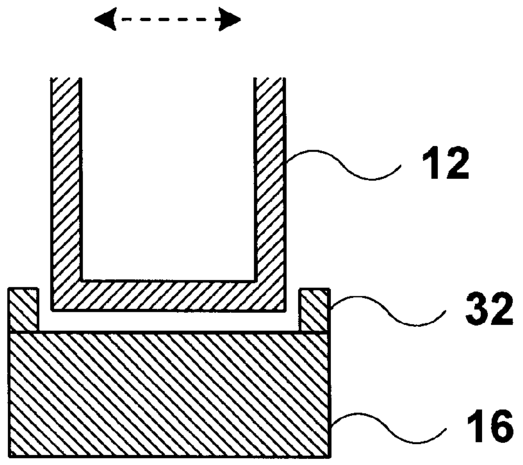
FIG. 23 shows a glass window pane covered with Mylar™.
Figure 24:
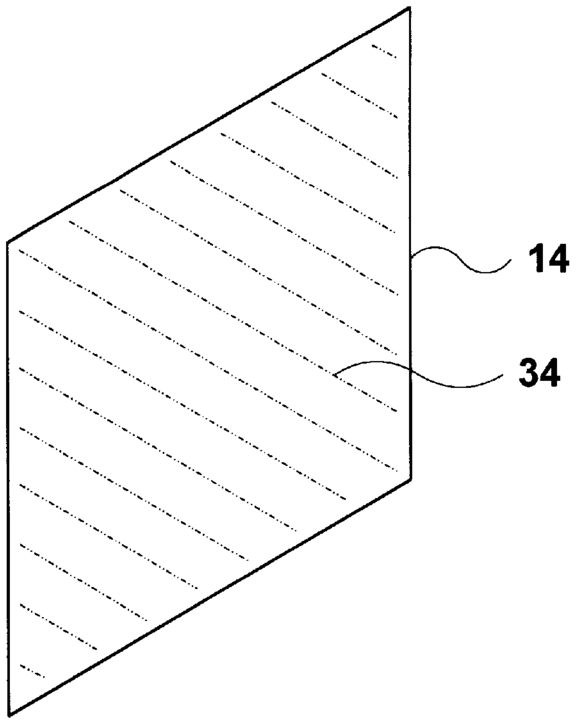
FIG. 24 shows a window pane of "shatter-proof" or "blast-proof" glass or other synthetic material with an embedded web or mesh.

Another method of holding the frame 12 within its receiving pan or receptor 16 under normal pressures is to manufacture the receiving pan or receptor 16 with frangible edges 32 as shown in FIG. 22. Under normal pressures the frame 12 sits between the frangible edges 32. Under blast pressures, the frame 12 displaces laterally rupturing the frangible edges 32 of the receiving pan or receptor 16.

All of the embodiments of the disclosed invention described thus far are based upon lateral displacement of a window frame 12 from its receiving pan or receptor 16. Further alternative embodiments comprise adhering or bonding sheets or films of synthetic material such as Mylar™ 34 to a traditional glass window 14 to prevent release of shrapnel or projectiles from glass sheathing as a result of displacement forces.

Further alternative embodiments utilize traditional "shatter-proof" or "blast-proof" glass or other synthetic material panes contained within the frame 12 and the various deployment mechanisms described herein.

Figure 25:
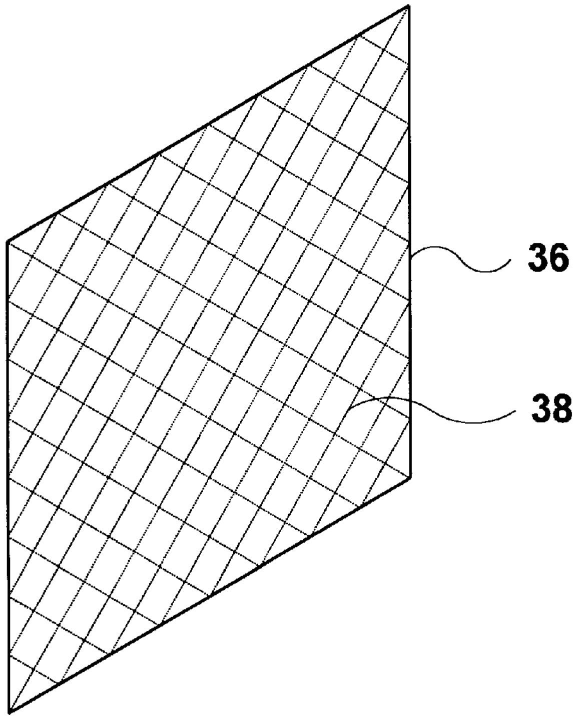
FIG. 25 shows a window pane of "shatter-proof" or "blast-proof" glass or other synthetic material with filament attachments to an embedded web or mesh.
Figure 26:
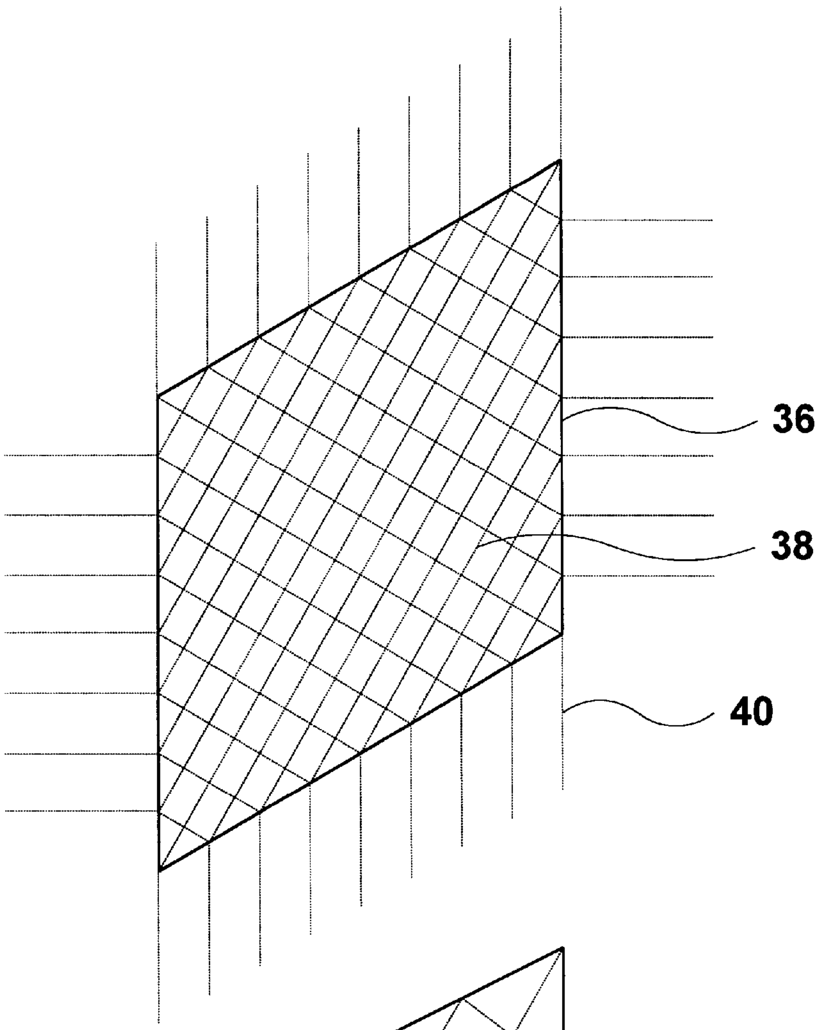
FIG. 26 shows a multi-panel window of "shatter-proof" or "blast-proof" glass or other synthetic materials.
Figure 27:
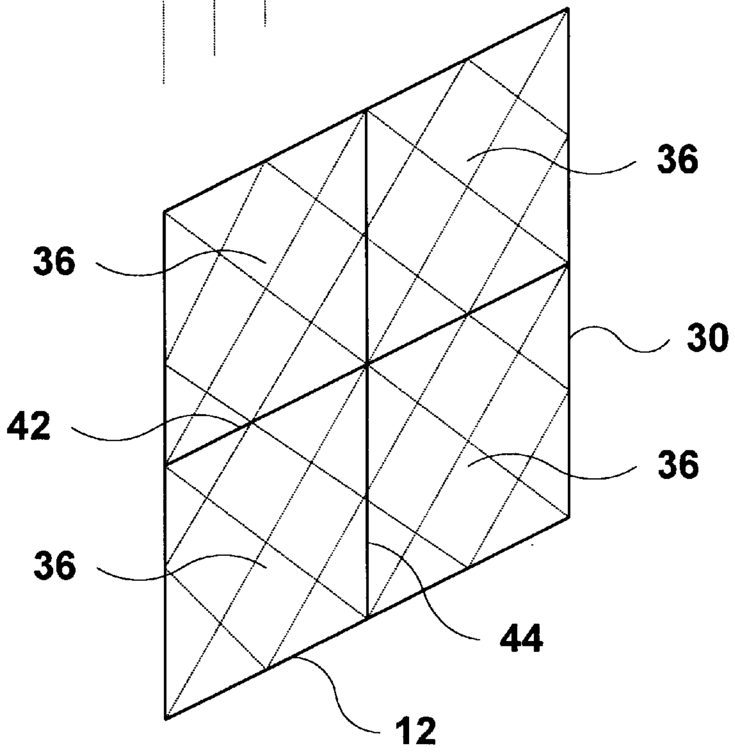
FIG. 27 shows an embodiment of the disclosed invention which allows lateral displacement of the frame with further lateral displacement of a pane comprised of "shatter-proof" or "blast-proof" glass or other synthetic materials.

One method of manufacturing traditional "shatter-proof" or "blast-proof" window panes 36 exhibited in FIG. 25 is to embed a web or mesh of material 38 into the material of the window pane 36 as it is manufactured. Such an embedded web or mesh 38 provides both points of attachment 40, filaments, as exhibited in FIG. 26, additional strengthening of the window pane 36 itself as well as an additional lateral displacement mechanism that can be used independently or in conjunction with the embodiments described herein. For example, filaments 40 can be attached to the frame 12 as well as muntins (42, 44) in a multi-pane window as is exhibited in FIG. 27.

Figure 28:
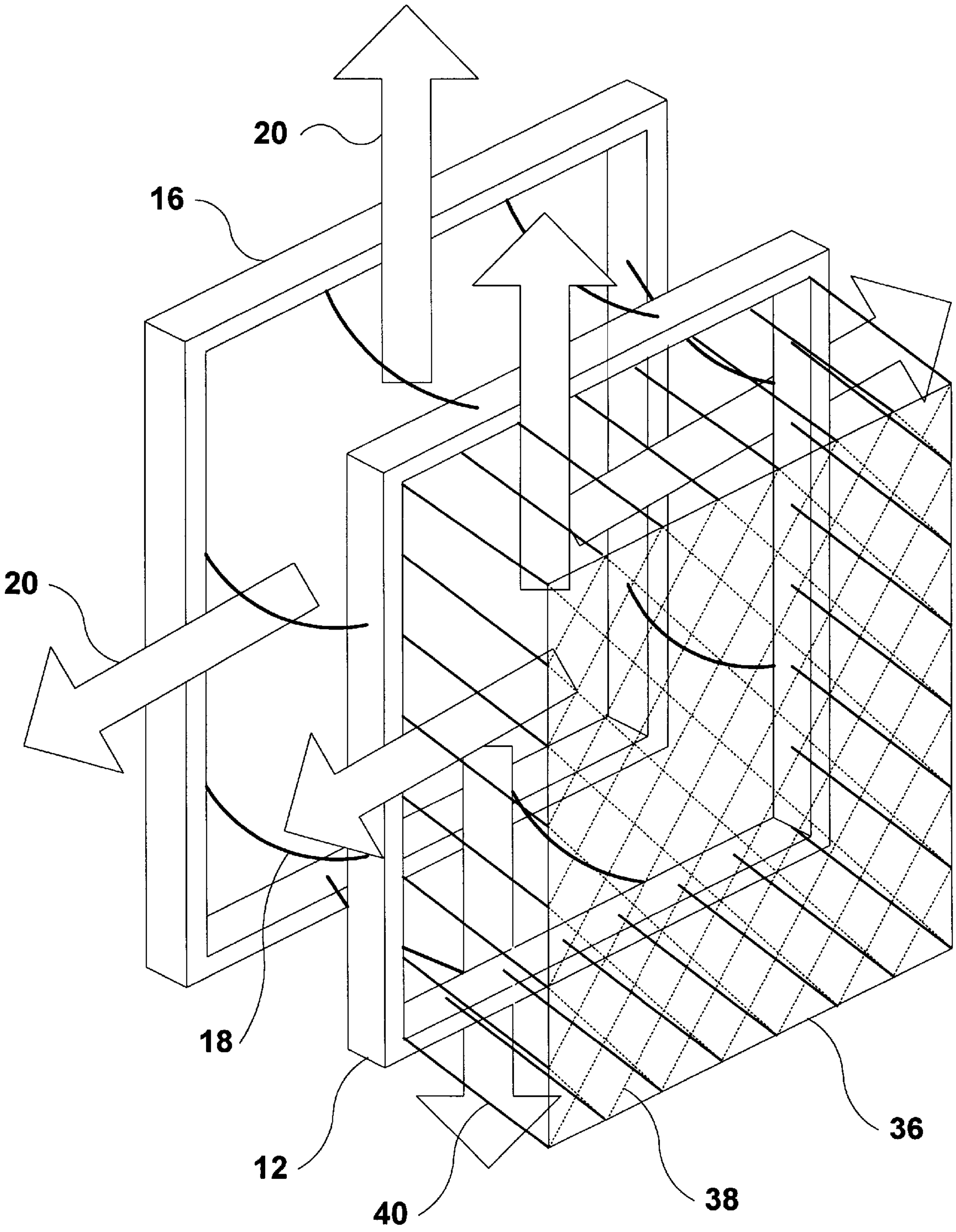
FIG. 28 shows an embodiment of the disclosed invention which utilizes an elastomeric membrane as a lateral displacement mechanism.

In this further alternative embodiment exhibited in FIG. 28, a plurality of filament lines 40 attached to the web or mesh material 38 or are connected to the frame 12. When the window pane 36 is laterally displaced, the filament lines 40 prevent the window pane 36 from moving more than the maximum length of the lines. As the overpressure is reduced, the window pane 36 will fall downward under gravity. The filament lines 40 constrain the window pane 36 movement.

Figure 29:
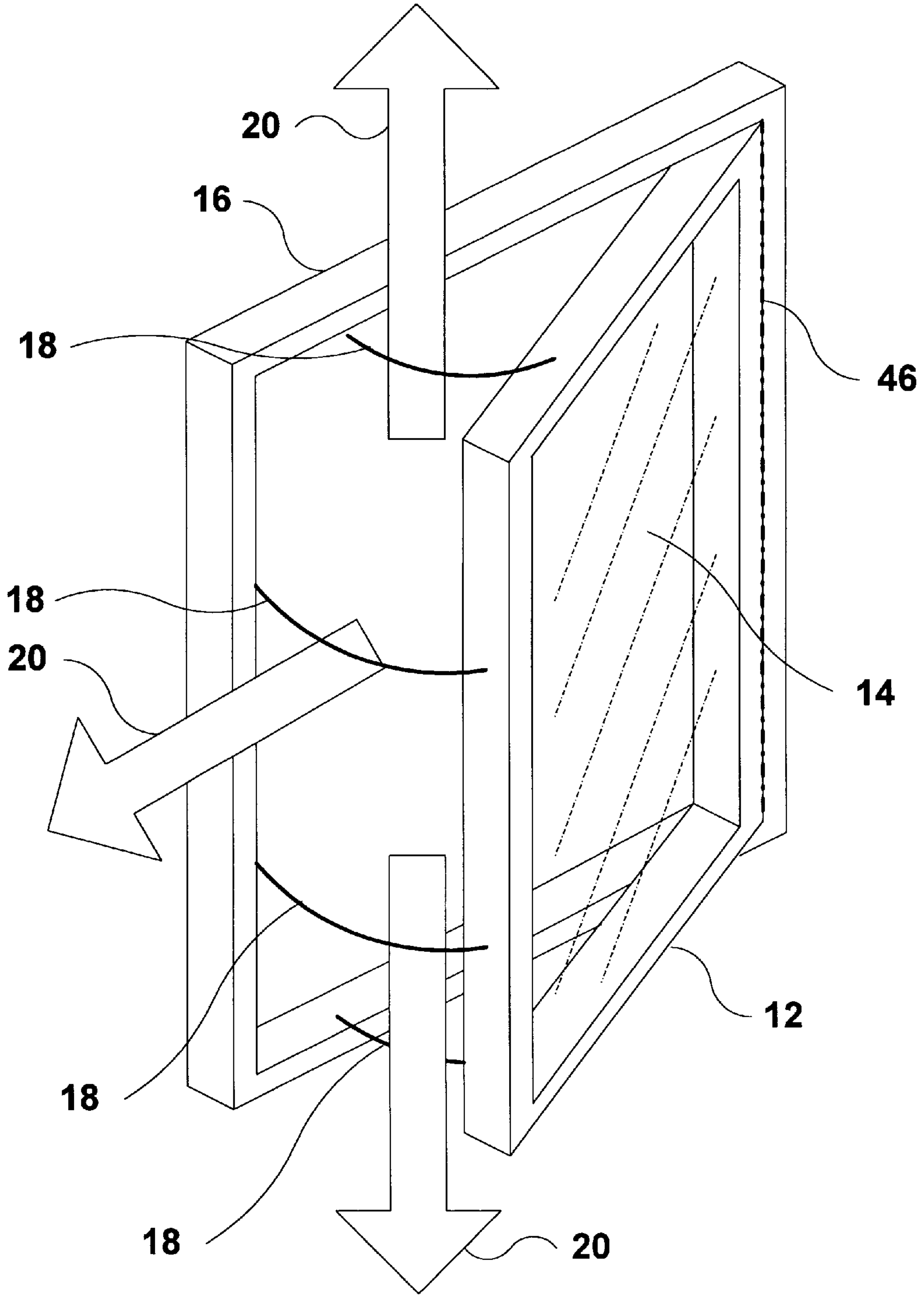
FIG. 29 shows an embodiment of the disclosed invention which utilizes an angular displacement mechanism.
Figure 30:
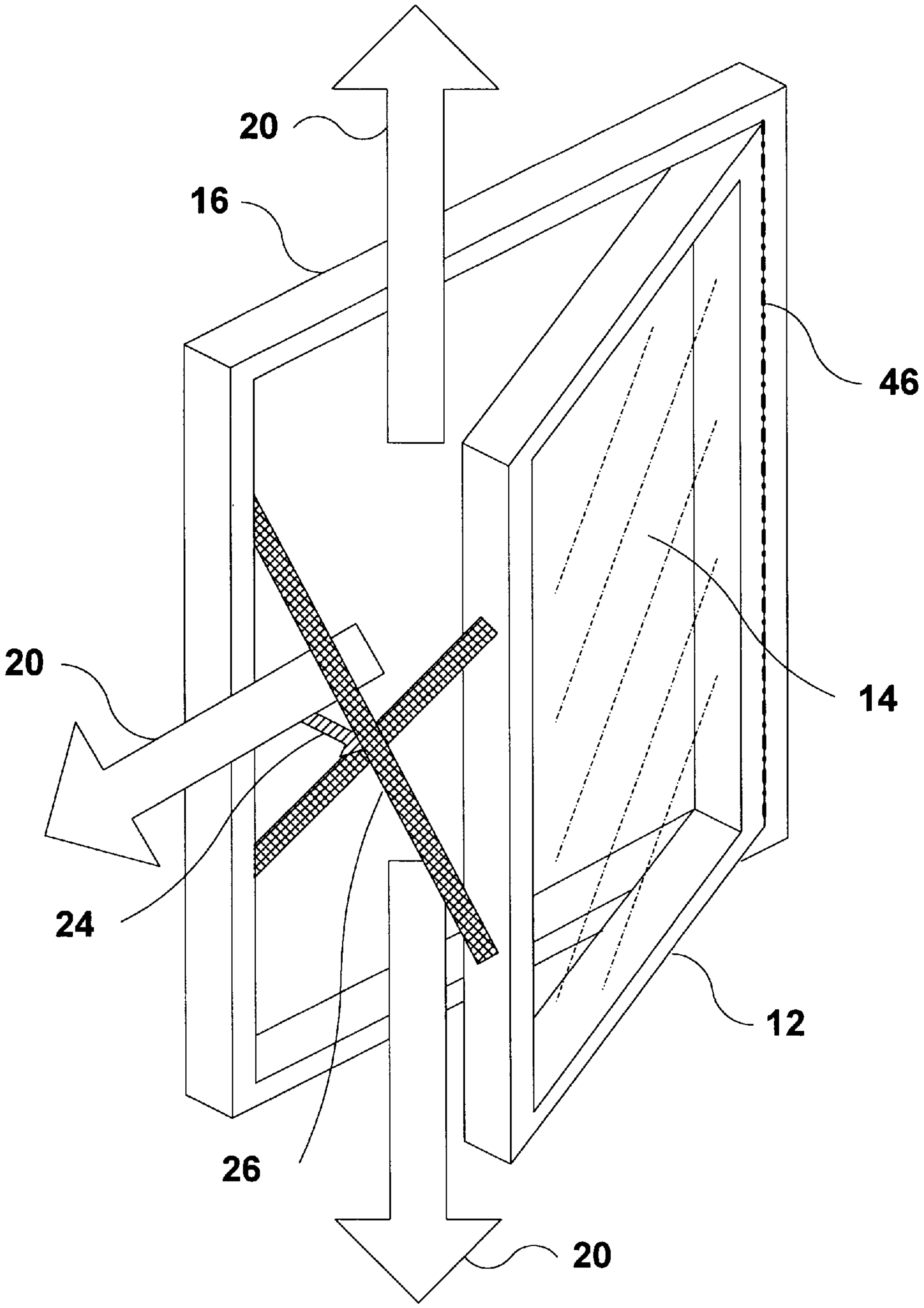
FIG. 30 shows an embodiment of the disclosed invention which utilizes an angular displacement mechanism in conjunction with a mechanical scissors mechanism deploying against the resistance of a spring.
Figure 31:
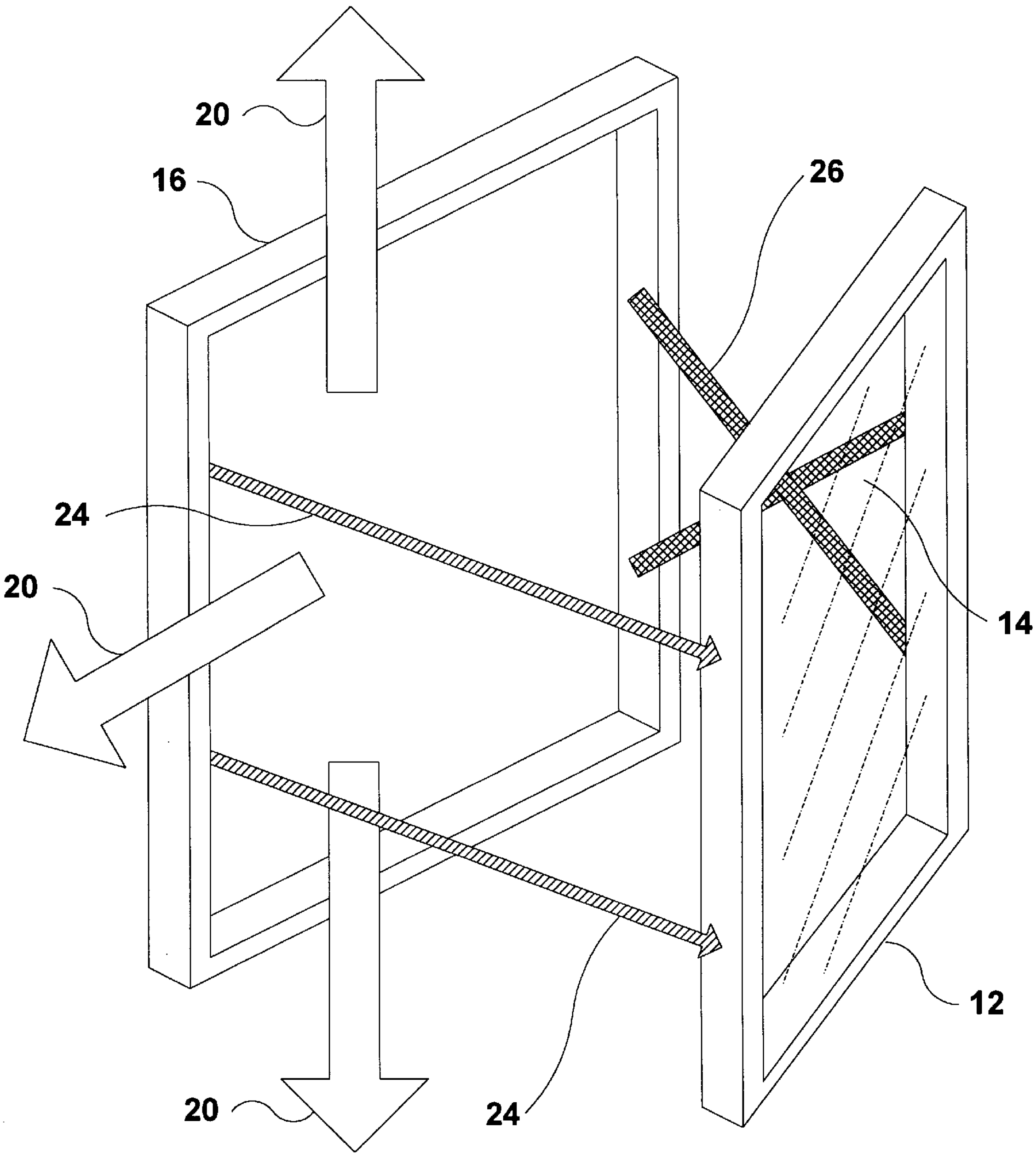
FIG. 31 shows an embodiment of the disclosed invention which utilizes an offset displacement framework in conjunction with an angular displacement mechanism.

A further alternative embodiment of the disclosed invention exhibited in FIG. 29 allows angular displacement of the frame 12. The frame 12 is hinged along one edge. As an overpressure is applied, the frame 12 is displaced angularly pivoting via a hinge 46 and constrained via retainers 18. Likewise, FIG. 30 shows a scissors mechanism 26 deploying against the resistance of a spring 24, however, any of the displacement mechanisms, a plurality of single-lever mechanical arms 26 or a plurality of scissors mechanisms 26, alone or working against the resistance of springs 24, may be utilized in this embodiment.

In a further alternative embodiment the frame 12 first displaces laterally via an offset displacement framework, a mechanical scissors mechanism 26, and then continues to displace laterally and angularly working against springs 24.

While the methods and apparatus have been developed to primarily deal with the effects of overpressure forces resulting from explosion originating outside of building, such as a terrorist bomb blast, the same methods and apparatus may be employed in a wide variety of residential, industrial and commercial applications. For example, explosions can take place in research and development laboratories. In this application, the window lateral displacement is from the building wall to the outside. Another example is product sampling and quality assurance laboratories at chemical refineries. Accidental explosions can take place outside or inside the laboratory. In this application, the window displacement could be in either direction, to the inside the building or to the outside the building. Another application would use of windows of this type in areas affected by tornadoes, hurricanes or other natural high winds to reduce shrapnel generated by very large differences between internal and external pressures.

Conclusion

Although the present invention has been described in detail with reference to one or more preferred embodiments, persons possessing ordinary skill in the art to which this invention pertains will appreciate that various modifications and enhancements may be made without departing from the spirit and scope of the Claims that follow. The various alternatives for reducing or eliminating high velocity particles resulting from explosive overpressure that have been disclosed above are intended to educate the reader about preferred embodiments of the invention, and are not intended to constrain the limits of the invention or the scope of Claims. The List of Reference Characters which follow is intended to provide the reader with a convenient means of identifying elements of the invention in the Specification and Drawings. This list is not intended to delineate or narrow the scope of the Claims.

List of Reference Characters

A Window
B Window Frame
C Window Head
D Window Sill
E Window Jamb
F Fixed Window Element
G Horizontal Moveable Window Element
H Vertical Moveable Window Element
I Fixed Window
J Single Panes, a Piece of Glass or Other Synthetic Material
K Multiple Panes, Pieces of Glass or Other Synthetic Material
L Horizontal Muntin
M Vertical Muntin
N Casement Window
O Top Meeting Rail
P Bottom Meeting Rail
Q Casement Ventilator
R Meeting Stile
S Projected Window
T Meeting Rail
U Projected Ventilator
V Pivoted Window
W Pivoted Ventilator
X Pivot Point
Y Sliding Window
Z Sliding Ventilator
AA Receiving Pan or Receptor
10 Disclosed Invention Window System
12 Window Frame
14 Generally Light Transmission Material, "Pane"
16 Receiving Pan or Receptor
18 Retainer
18A Woven Cloth Retainer
18B Rope Retainer
18C Cable Retainer
18D Filament Retainer
18E Plastic Retainer
18F Velcro™ Retainer
20 Overpressure Release
22 Single-Lever Arm
24 Spring
26 Scissors Mechanism
28 Elastomeric Membrane
30 Elevated Edges of Receiving Pan or Receptor
32 Frangible Edge of Receiving Pan or Receptor
34 Mylar™
36 "Shatter-proof" or "Blast-proof" Window Pane
38 Embedded Web or Membrane
40 Filament Lines
42 Horizontal Muntin
44 Vertical Muntin
46 Hinge

What is claimed is:

1. A shrapnel mitigating window comprising:

a frame (12);

a sheet of generally light transmissive material (14); said sheet of generally light transmissive material (14) being held in said frame (12);

a window receiving pan (16); said frame (12) residing generally adjacent to said window receiving pan (16) during normal pressure; and a retainer (18); said retainer (18) being coupled to said frame (12) and to said window receiving pan (16);

said frame (12) being displaced from its position generally adjacent to said window receiving pan (16) during blast pressure to mitigate shrapnel.

2. A shrapnel mitigating window as claimed in claim 1, in which said retainer (18) is fabricated from woven cloth (18A).

3. A shrapnel mitigating window as claimed in claim 1, in which said retainer (18) is fabricated from rope (18B).

4. A shrapnel mitigating window as claimed in claim 1, in which said retainer (18) is fabricated from cable (18C).

5. A shrapnel mitigating window as claimed in claim 1, in which said retainer (18) is fabricated from filament (18D).

6. A shrapnel mitigating window as claimed in claim 1, in which said retainer (18) is fabricated from plastic (18E).

7. A shrapnel mitigating window as claimed in claim 1, in which said retainer (18) is fabricated from Velcro™ (18F).

8. A shrapnel mitigating window as claimed in claim 1, in which said retainer (18) is a metal or composite material single-lever arm (22).

9. A shrapnel mitigating window as claimed in claim 8, in which said single-lever arm (22) deploys against the resistance of a spring (24).

10. A shrapnel mitigating window as claimed in claim 1, in which said retainer (18) is a mechanical scissors mechanism (26).

11. A shrapnel mitigating window as claimed in claim 10, in which said mechanical scissors mechanism (26) deploys against the resistance of a spring (24).

12. A shrapnel mitigating window as claimed in claim 1, in which said retainer (18) is an elastomeric membrane (28).

13. A shrapnel mitigating window comprising:

a frame (12);

a sheet of generally light transmissive material (14); said sheet of generally light transmissive material being shatter-proof (34); said sheet of generally transmissive material including an embedded web (36); said embedded web being coupled to said frame (12) at a point of attachment (38);

a window receiving pan (16); said frame (12) residing generally adjacent to said window receiving pan (16) during normal pressure; and a retainer (18); said retainer (18) being coupled to said frame (12) and to said window receiving pan (16);

said frame (12) being displaced from its position generally adjacent to said window receiving pan (16) during blast pressure to mitigate shrapnel.

14. A shrapnel mitigating window as claimed in claim 13, in which said retainer (18) is fabricated from woven cloth (18A).

15. A shrapnel mitigating window as claimed in claim 13, in which said retainer (18) is fabricated from rope (18B).

16. A shrapnel mitigating window as claimed in claim 13, in which said retainer (18) is fabricated from cable (18C).

17. A shrapnel mitigating window as claimed in claim 13, in which said retainer (18) is fabricated from filament (18D).

18. A shrapnel mitigating window as claimed in claim 13, in which said retainer (18) is fabricated from plastic (18E).

19. A shrapnel mitigating window as claimed in claim 13, in which said retainer (18) is a single-lever arm (22).

* * * * *